A. N. CROSS.
ARTIFICIAL TOOTH.
APPLICATION FILED JAN. 20, 1919.
1,296,928.    Patented Mar. 11, 1919.
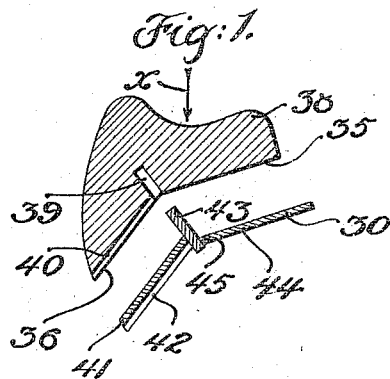
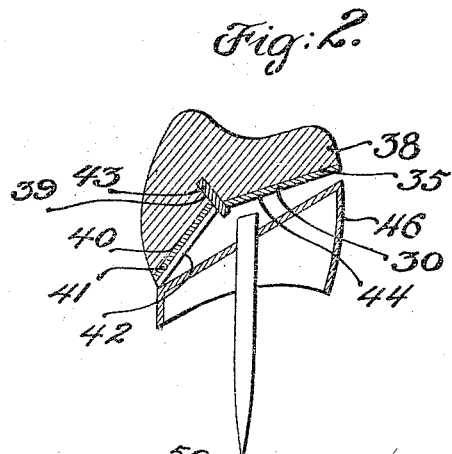
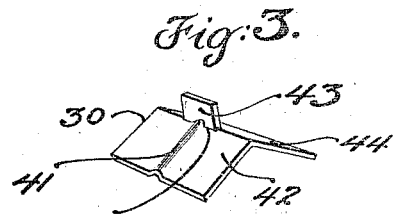
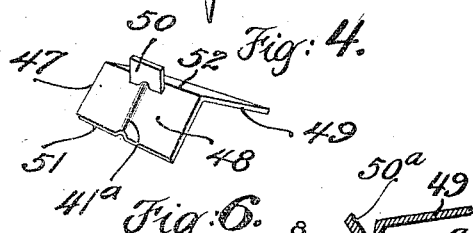
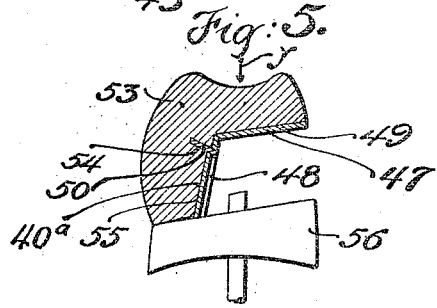
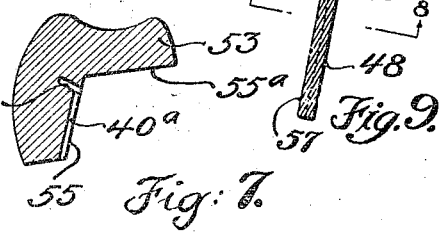
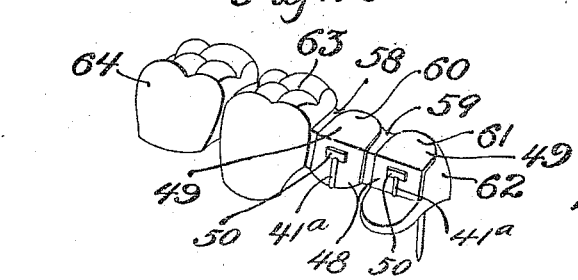
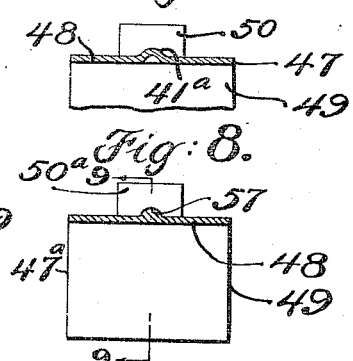
WITNESS:    INVENTOR.
Mary A. Inglar    Arthur N. Cross,
Augustus B. Copper    BY Joshua R. H. Potts
    his ATTORNEY.

UNITED STATES PATENT OFFICE.

ARTHUR N. CROSS, OF PHILADELPHIA, PENNSYLVANIA.

ARTIFICIAL TOOTH.

1,296,928.  Specification of Letters Patent.  Patented Mar. 11, 1919.

Original application filed February 1, 1917, Serial No. 145,838. Divided and this application filed January 20, 1919. Serial No. 271,946.

*To all whom it may concern:*

Be it known that I, ARTHUR N. CROSS, a citizen of the United States, residing at Philadelphia, in the county of Philadelphia and State of Pennsylvania, have invented certain new and useful Improvements in Artificial Teeth, of which the following is a specification.

Certain of the subject matter of this application is a division of my application for United States Patent for artificial teeth, filed February 1st, 1917, Serial No. 145,838, patented July 24th, 1917, Patent No. 1,234,139.

One object of the invention of my present application is to provide a secure mounting for artificial teeth of various characters where porcelain tooth cusps or facings are employed; the construction of my invention being such as to securely hold the porcelain tooth cusps or facings to a backing which includes an angularly bent plate.

Another object is to so construct my invention that it will be readily adaptable for teeth of various shapes and can be used with advantage in connection with caps and bridges.

Another object is to so design my invention that it will be durable and can be quickly and easily manufactured and assembled.

These objects, and other advantageous ends which will be described hereinafter, I attain in the following manner, reference being had to the accompanying drawings in which—

Figure 1 is a detached central sectional elevation showing my improved backing plate having portions arranged at an angle to fit an all-porcelain tooth cusp.

Fig. 2 is a sectional view showing the backing and the tooth cusp of Fig. 1 joined together and positioned ready to be soldered to what is known as a Richmond cap.

Fig. 3 is a perspective view of my improved backing, as shown in Figs. 1 and 2.

Fig. 4 is a perspective view of a modified form of my improved backing plate.

Fig. 5 is an elevation, partly in section, showing how the form of my improved backing, shown in Fig. 4, is attached to a porcelain tooth cusp and positioned on a Richmond cap ready to be secured thereto.

Fig. 6 is a sectional elevation of the porcelain tooth cusp of Fig. 5 with the backing plate removed.

Fig. 7 is an inverted sectional plan view taken through the rib of my improved backing plate in which the rib is produced by pressing the backing plate.

Fig. 8 is an inverted sectional plan view taken on the line 8—8 of Fig. 9 and showing my improved backing made entirely of a single solid piece of metal.

Fig. 9 is a sectional elevation taken on the line 9—9 of Fig. 8, and

Fig. 10 is a perspective view of a bridge illustrating how my invention is applicable in securing tooth cusps thereto.

Referring to the drawings, Fig. 1 shows a form of my invention in which a metallic backing plate 30 is bent at an angle to engage the angularly disposed surfaces 35 and 36 of a porcelain tooth cusp 38. The cusp 38 has a cavity 39 extending inwardly from the junction of the surfaces 35 and 36, said cavity extending at an incline or angle to the direction of the biting movement which, in the drawing, is indicated by the arrow $x$; said cavity being rectangular in cross section. The surface 36 of the tooth cusp 38 is provided with a groove 40 which extends transversely to the cavity 39, as clearly shown in Fig. 1. The backing plate 30 has a rib 41 projecting from its bent portion 42 and this rib 41 is adapted to enter the groove 40. A tongue 43, which is rectangular in cross section, projects from the backing plate 30 at the junction of the portion 42 with the portion 44; said tongue, in the present instance, being illustrated as a separate piece of metal which can be soldered or otherwise secured within a hole 45 in said plate 30 and is adapted to fit within the cavity 39.

Fig. 2 shows the metallic backing plate secured to the cusp 38 with the portions 42 and 44 of the plate 30 fitting against the surfaces 36 and 35 and the rib 41 and tongue 43 fitting, respectively, within the groove 40 and cavity 39. Sufficient cement can be interposed between the parts to provide an adhesion to prevent the detachment of the several parts.

In Fig. 2, the parts above described are shown in a position mounted above a Richmond cap 46 and, when in this position, the plate 30 can be soldered to the top of said cap to provide an integral structure.

In Fig. 4 I have shown a modified form of the bent plate and tongue structure in which 47 represents the bent plate having flat angular portions 48 and 49. The tongue 50 intercepts the portion 48 between its edge 51 and the junction 52 of said portions 48 and 49. The plate 47 is provided with a rib 41ª which extends transversely to the tongue 50.

Fig. 5 shows the backing of Fig. 4 applied to a tooth cusp 53 which is provided with two inwardly extending flat surfaces 55 and 55ª, a cavity 54 in which the tongue 50 fits, and a groove 40ª in which the rib 41ª fits. In this form of my invention, the cavity 54 extends inwardly from the flat surface 55 of the tooth cusp 43. However, the cavity 54 and tongue 50 extend at an incline to the direction of the bite, as indicated by the arrow $y$, so that during the action of the tooth, there is practically no chance of fracture of the cusp which is usually made of porcelain. Fig. 5 also shows the parts in arrangement above a Richmond cap 56.

In Figs. 8 and 9 I have illustrated my improved backing plate 47ª, rib 57 and tongue 50ª all made from a single solid piece of metal and in which all of the parts are made integral. In all other respects this form of my invention is similar to that described in connection with Figs. 4 and 5 and I have, therefore, given similar parts corresponding reference numerals.

In Fig. 10 I have illustrated a bridge 59 which can be constructed by using the structure of my present invention in which the body portion 59 of the bridge includes bent plates 60 and 61 which can be mounted to support the various forms of teeth, the plate 61 being connected to a Richmond cap 62 while the plate 60 is connected directly to the body portion 59 and can be used to support a tooth cusp such, for example, as the tooth cusp shown at 63. The end of the bridge can be provided with a molar crown 64 which can be constructed in the usual manner and preferably made of gold.

By the construction of my invention, as above described, the bent backing plate will provide a durable and strong support for the tooth cusps or facings. The combination of the rib and tongue in respect with the groove and cavity of the tooth cusp serves to securely lock the backing to the tooth cusp. Furthermore, by arranging the angular backing plate and the tongue and cavity, as above described, the biting movement of the teeth will not cause a fracture of the tooth facing, for the reason that any relative pressure, for example, as in the direction of the arrows $x$ and $y$ in Figs. 1 and 2, will cause a binding action between the bent outer surfaces of the plate, tongue and the backing portion of the tooth cusp.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:

1. An artificial tooth having a facing, said facing including two flat surfaces extending inwardly at an incline to each other; a cavity extending into said facing and intercepting at least one of said faces, said cavity extending at an incline to the direction of the biting movement of the tooth; and a plate having surfaces bent at an angle to each other and adapted to fit against the flat surfaces of said facing, said plate having a tongue extending therefrom in the direction of and adapted to fit within said cavity, substantially as described.

2. An artificial tooth having a facing, said facing including two flat surfaces extending inwardly at an incline to each other; a cavity extending into said facing and intercepting at least one of said faces, said cavity extending at an incline to the direction of the biting movement of the tooth; and a plate having surfaces bent at an angle to each other and adapted to fit against the flat surfaces of said facing, said plate having a tongue extending therefrom in the direction of and adapted to fit within said cavity, said facing having a groove extending transversely to said cavity, said plate having a rib adapted to fit within said groove; substantially as described.

In testimony whereof I have signed my name to this specification in the presence of two subscribing witnesses.

ARTHUR N. CROSS.

Witnesses:
MARY A. INGLOR,
CHAS. E. POTTS.

Copies of this patent may be obtained for five cents each, by addressing the "Commissioner of Patents, Washington, D. C."